ELECTROMAGNETIC WAVE FILTER

Filed March 28, 1958

E. A. OHM

Roy M. Porter, Jr.

ATTORNEY

United States Patent Office 2,972,721

Patented Feb. 21, 1961

2,972,721

ELECTROMAGNETIC WAVE FILTER

Edward A. Ohm, Red Bank, N.J., assignor to Bell Telephone Laboratories, Incorporated, New York, N.Y., a corporation of New York Filed Mar. 28, 1958, Ser. No. 724,684

12 Claims. (Cl. 333—9)

Figures 1, 2, 3, 4, 4A:
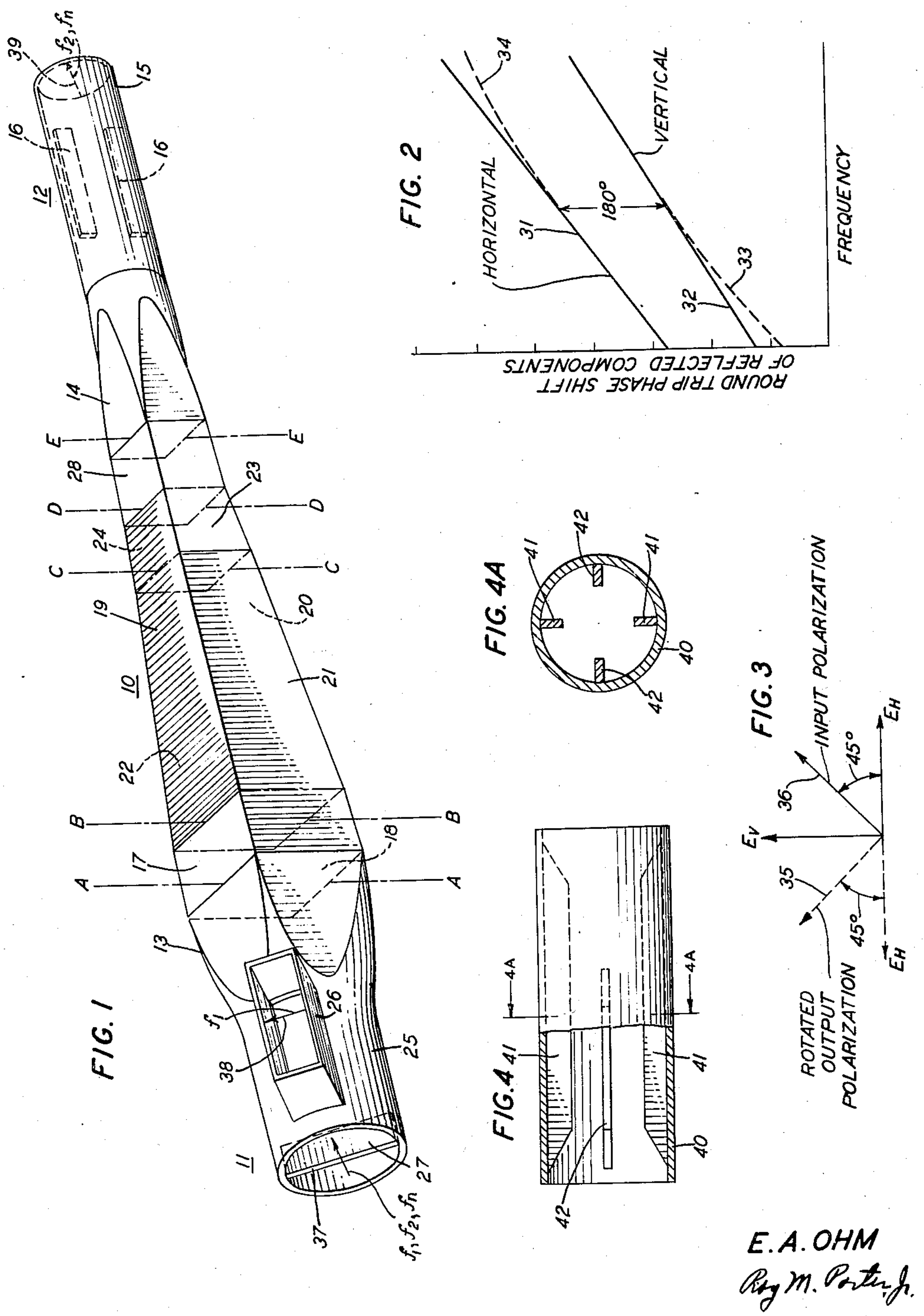

This invention relates to multi-channel high frequency, microwave and millimeter wave communication systems and, more particularly, to methods and means for segregating, branching or recombining the several channels or broadband signals making up the intelligence to be transmitted, received, amplified or otherwise utilized at terminal or repeater stations in a communication system.

With the trend toward higher frequencies and broader bands in microwave communication systems, it has been necessary to depart more and more from the classical concepts of filters in the devices used to separate one group of frequency components from another group of frequency components. Lumped element types of filters are obviously too limited in bandwidth and even the extensively used networks that make use of the relatively broadband properties of quarter wavelength transmission line sections have either too narrow a bandwidth or too poor a discrimination characteristic.

It is, therefore, an object of the present invention to separate channels having an arbitrary bandwidth and an arbitrary frequency separation between channels.

It is a further object to remove all undesirable bandwidth limiting frequency selectivity while maintaining a high degree of frequency discrimination between bands in a channel branching system.

These and other objects are accomplished in accordance with the invention by making a novel combined use of two well-known and unrelated phenomena, namely: the frequency selective reflection properties of a conductively bounded wave guide that is tapered in transverse dimension through cutoff at successive frequencies and the polarization rotating properties of a 180 degree phase shifter. Thus, linearly polarized multiband wave energy having equal horizontal and vertical components is applied to a differential phase-reflecting taper that reflects each frequency in one band in the vertical component 90 degrees sooner than it reflects that frequency in the horizontal component. The reflected components return with a 180 degree differential phase therebetween to combine to form a linearly polarized resultant component polarized at 90 degrees to the applied wave and, therefore, capable of separation therefrom. Frequencies in other bands pass through the taper in the original polarization. Since each frequency in the branched band is in effect handled separately, i.e., the point of reflection at each frequency is separately determined to maintain the reflected 180 degree phase difference, no band limiting frequency selectivity is involved in the present invention. Therefore, channels of arbitrary bandwidth may be separated. Furthermore, since the discrimination between bands is determined by the precise and accurately defined condition of cutoff in a conductively bounded guide, discrimination is high and the spacing between bands may be arbitrary.

These and other objects and features, the nature of the present invention, and its various advantages will appear more fully upon consideration of the accompanying drawings and the following detailed description of these drawings:

Fig. 1 is a perspective view of a wave guide embodiment of the present invention;

Fig. 2, given for the purposes of explanation, shows the round trip phase shift versus frequency characteristic of wave energy in the embodiment of Fig. 1;

Fig. 3, given for the purposes of illustration, shows vectorally the rotation of the input polarization into the reflected output polarization; and Fig. 4, together with its cross-sectional view Fig. 4A, illustrates a more refined embodiment of a portion of the structure of Fig. 1.

Referring more specifically to Fig. 1, a branching filter assembly in accordance with the invention is shown capable of separating or branching a channel or broadband signal centered about the frequency $f_1$ from other broadband signals centered about the successively higher frequencies $f_2$ and $f_n$. The bandwidth of each channel or the separation between channels or both may be any arbitrary number of frequencies. The several components comprising the branching filter include a differential phase-reflecting taper 10 adapted to pass both vertically and horizontally polarized components of the broadband signals $f_2$ and $f_n$ and to reflect successive frequencies of the broadband signal $f_1$ that are vertically polarized at points one-quarter wavelength removed from the points of reflection of horizontally polarized components of corresponding frequency. Taper 10 is fed by a transducer 11 adapted to apply linearly polarized wave energy to taper 10 in a polarization inclined at 45 degrees to the vertical and horizontal polarizations in taper 10 and to receive wave energy within the channel $f_1$ reflected from taper 10 in a polarization at right angles to the applied polarization. Taper 10 is followed by a phase correcting section 12. Suitable transition sections 13 and 14, for coupling between wave guide components of round cross section and components of square cross section, are interposed respectively between transducer 11 and taper 10 and between taper 10 and phase corrector 12. The nature of each of these components and the function each performs will be considered separately hereinafter.

The heart of the present invention is the differential phase-reflecting taper 10 comprising an elongated conductively bounded structure of rectangular transverse cross section having a square cross section at section A—A of dimensions large enough that its cutoff frequency is well below and therefore will support the lowest frequency in the lowest band $f_1$. The square cross section at the other end at section D—D has dimensions small enough that its cutoff frequency is above the highest frequency in the lowest band $f_1$ and below all other frequencies in the bands $f_2$ and $f_n$. Commencing at cross section A—A, the top and bottom conductive boundary comprises parallel portions 17 and 18 that are one-quarter of the mean wavelength of $f_1$ in longitudinal extent to section B—B and converging portions 19 and 20 that gradually reduce the vertical dimension of successive cross sections from that at B—B to that at D—D. The side conductive boundaries comprise converging portions 21 and 22 that commence at cross section A—A and with a rate of taper substantially equal to that of converging portions 19 and 20, reduce the horizontal dimension from that at cross section A—A to that of cross section D—D. Parallel portions 23 and 24, substantially one-quarter wavelength long, extend from the end of portions 21 and 23 in section C—C to cross section D—D. A short section of guide 28 of uniform square cross section continues from section D—D to section E—E to assure cutoff for the highest frequency in $f_1$.

The resulting structure tapers to cutoff for a given frequency in a horizontal polarization at one cross section along its length and tapers to cutoff at that frequency in a vertical polarization at a second cross section approximately one-quarter wavelength further along its length. Since wave energy applied at cross section A—A will propagate into the taper until it reaches a cutoff cross section and then be reflected, the round trip or reflected phase shift of a horizontally polarized component will be 180 degrees greater than the round trip or reflected phase shift of a vertically polarized component. This is illustrated in Fig. 2 which shows the reflected phase shift of the two components versus frequency. The solid characteristic 31 represents the round trip phase $\theta_H$ of a horizontally polarized component when the boundary portions 21 and 22 converge at a rate linear with longitudinal distance. The solid characteristic 32 represents the round trip phase $\theta_V$ of a vertically polarized component when the boundary portions 19 and 20 converge at an identical rate. At the mid-band frequency $f_1$, the phase shift between $\theta_H$ and $\theta_V$ can be made exactly 180 degrees. At higher frequencies the difference is slightly greater and at lower frequencies slightly less. An improved taper producing a 180 degree difference across a wider band is illustrated by the broken characteristics 33 and 34. Characteristic 33 is produced by decreasing the average guide width between portions 21 and 22 as by deforming guide 10 by pressure at an appropriate point nearer to cross section A—A than to cross section D—D. This decrease in width will move the effective reflecting cross section of a vertically polarized component toward cross section A—A and decrease the round trip phase shift at the lower frequencies of the band. At the higher frequencies, the effect of this deformation is small since for these frequencies the altered region is far from cutoff. Characteristic 34 is produced by decreasing the distance between portions 19 and 20 by applying pressure at a point nearer to cross section D—D than to cross section A—A to decrease the round trip phase shift at higher frequencies in the band for a horizontally polarized component. Both deformations have the tendency to maintain the 180 degree phase shift difference between vertically and horizontally polarized components at the mid-band frequency $f_1$ and to very closely approximate 180 degrees phase difference over the entire band. If a very wide band is contemplated, both tapers may be preformed or pressure may be applied at a multiplexity of points.

Wave energy is applied to taper 10 by transducer 11 which may be any of several microwave components adapted to selectively couple to and from wave energy in one of the two linearly polarized orthogonal modes in a circular wave guide to the exclusion of the other orthogonal mode. It may be of the directional coupler type described in U.S. Patent 2,748,350 granted May 29, 1956 to S. E. Miller or a broadband shunt connected T junction as described in U.S. Patent 2,682,610 granted June 29, 1954 to A. P. King or the improved shunt connected junction as disclosed in my copending application Serial No. 665,169, June 12, 1957. As illustrated in the drawing, transducer 11 includes a section of circular cross section wave guide 25, a shunt connected rectangular side arm guide 26, and a septum 27. Certain matching elements disclosed in the above-noted patents are not shown. Transducer 11 is connected to taper 10 at cross section A—A with the polarization selected by arm 26 inclined at 45 degrees to the vertical and horizontal polarizations considered above in taper 10 by means of a transition section 13 that gradually changes from round to square cross section.

The broadband signals $f_1$, $f_2$ and $f_n$ to be separated are applied to guide 25 in the linear polarization represented by vector 37 on Fig. 1 or by vector 36 on Fig. 3. This polarization is substantially unaffected by septum 27 and arm 26 and enters taper 10 at cross section A—A with equal vertical and horizontal components therein as shown by the solid vectors $E_V$ and $E_H$ on Fig. 3. Components in the bands $f_2$ and $f_n$ pass on to cross section D—D. Components in the $f_1$ band are reflected with a 180 degree relative phase delay introduced to the horizontal component as a result of its additional travel down taper 10. This phase reversal is represented by the broken vector $E_H$ on Fig. 3. The vector sum of $E_H$ and $E_V$ produces a polarization rotation of their resultant of 90 degrees bringing this resultant into the polarization represented by vector 35 on Fig. 3 or 38 on Fig. 1. This polarization is reflected by septum 27 and accepted by guide 26 so that the components in the broadband centered upon the frequency $f_1$ are separated from the bands $f_2$ and $f_n$.

A certain amount of frequency dispersion has been introduced to the components making up the band $f_1$, i.e., the higher frequencies have been delayed due to their longer travel down taper 10 relative to the low frequencies. However, it is noted that this dispersion is complementary with that introduced by other wave guide components in the system and so instead of being a disadvantage, it may, in fact, be utilized to cancel out part of the dispersion introduced elsewhere in the system. If this is not desired, the dispersion introduced by taper 10 may be equalized merely by passing the components of $f_1$ through an appropriate length of wave guide having a cutoff frequency close to the lowest frequency in the band. The lower frequencies will be delayed more than the higher frequencies and equalization will take place.

The frequency components in the bands centered upon $f_2$ and $f_n$ emerge at cross section D—D or E—E as elliptically polarized waves with the vertical component thereof advanced in phase with respect to the horizontal component. This is because the magnetic plane dimension of a wave guide determines its cutoff frequency, which in turn determines the phase velocity of wave energy propagating therethrough. A narrow magnetic plane across section has a cutoff frequency that is higher, resulting in a cutoff frequency that is nearer to the operating frequency and a phase velocity that is faster than the phase velocity in a wider magnetic plane cross section. Now the total phase of the vertical component includes the sum of the phase shifts introduced along the taper from section A—A to C—C and along the section of narrower magnetic plane dimension from C—C to D—D. On the other hand, the total phase of the horizontal component includes the sum of phase shifts introduced along the taper from section B—B and D—D and along the section of wider magnetic plane dimension from A—A to B—B. Since the phase constants along the taper portions are equal for both polarizations, the net phase difference is a result of the higher cutoff and faster phase velocity in section C—C to D—D to which the vertical polarization is exposed as compared with the lower cutoff and slower phase velocity in section A—A to B—B to which the horizontal polarization is exposed. Thus, equalizer 12 is provided to introduce an equal and compensating phase relay to the vertical component.

In accordance with a novel feature of the invention, this compensation is achieved over a broadband by exposing the vertical component to a propagating structure having over an equivalent distance the same cutoff frequency as that to which the horizontal component was exposed and similarly exposing the horizontal component to the same cutoff frequency as that to which the vertical component was exposed. More specifically, equalizer 12, which is coupled by transducer 14 to square guide 28 at section E—E, comprises a section of circular guide 15 having such a diameter that its cutoff frequency is equal to that between section C—C and D—D for the vertically polarized wave. Guide 15 is capacitively loaded by two oppositely positioned metallic fins 16 extending in the electric plane of the vertically polarized wave therein by an amount that raises the cutoff frequency for the vertically polarized component to equal that of the cutoff frequency of the horizontally polarized component between sections A—A and B—B. Fins 16 extend longitudinally for a distance equal to the distance between A—A and B—B (one-quarter wavelength of the main frequency of the branched channel $f_1$). Since the phase constant of an unloaded rectangular wave guide and a wave guide loaded with fins of the type described are identical functions of operating frequency and cutoff frequency, the phase constants will be identical for all frequencies when the cutoff frequencies are equal. Thus, the vertical component of every frequency in the broadband channels centered about both $f_2$ and $f_n$ is delayed by fin 16 by an amount equal to the delay introduced to the horizontal component at that frequency between sections A—A and B—B (equal phase constants over equal distances). Similarly, every frequency of the horizontal component (which is unaffected by fins 16) is exposed to a phase constant in guide 15 equal to the phase constant to which the vertical component was exposed in sections C—C and D—D. The vertical and horizontal components are thereby brought into phase to result in a linearly polarized wave as represented by vector 39. This energy may be applied to a similar branching filter for separating the next band $f_2$ from further bands of higher frequency. Any number of branching filters of the type shown may thus be cascaded, each successive filter being scaled in accordance with the principles described to reflect and separate successively higher frequencies.

Obviously, the sharply discontinuous edges of fins 16 will produce undesired reflections in a refined application of the invention. However, the usual practice of adding tapers or stepped transformer sections at either end of the fin cannot be blindly followed without upsetting the critical phase constant-distance relationship specified. Fig. 4, however, shows an improved embodiment for equalizer 12 in which reflections are minimized and the required phase relationships are maintained.

Referring therefore to Fig. 4 and the cross-sectional view thereof shown in Fig. 4A, two pairs of vanes 41 and 42 are disposed in the vertical and horizontal planes, respectively, in guide 40. All vanes begin and end in identical tapers and extend into the center of guide 40 by the amount defined for vanes 16 of Fig. 1. Vanes 41, however, have a total length that is one-quarter wavelength of the main frequency of $f_1$ as measured in the large square guide of cross section A—A longer than the total length of vanes 42. Thus, the effect on the phase of a vertically polarized wave is the result of the differential lengths of the pairs of vanes and is the same as that of vanes 16 in Fig. 1 since the vanes 42 in Fig. 4 produce a total phase change in the horizontal polarization that is exactly equalized by the phase change produced in the vertical polarization by the tapered portions of vanes 41 together with the phase change due to portions of their untapered length that equals the untapered length of vanes 42. These latter portions are included only to separate the points of discontinuity at the beginning and ending of the tapers of vanes 42 and are not of critical length.

It should be noted that all components making up the invention are reciprocal and it may be used as well to combine channels. Thus, successively lower channels are added to the higher frequency channels already combined.

It should also be noted that the disclosed tapered cutoff characteristic is an electrical property and does not necessarily require that the physical conductive boundary of the guide be itself tapered. For example, the guide itself could be of uniform cross section and electrically tapered by having screws on its side walls that penetrate progressively less into the guide along its length. A similar effect could be obtained by the appropriate use of tapered elements of dielectric material or tapered vanes of conductive material in a wave guide of constant cross section.

A modified version of the present invention, which may be viewed from certain aspects as an improvement hereon, is disclosed in my copending application Serial No. 816,406, filed May 28, 1959.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. Filter means for separating a broadband of frequencies of electromagnetic wave energy from other frequencies comprising input means for supporting said energy in a given polarization, an elongated conductively bounded structure connected to said input for reflecting at each frequency in said band equal orthogonal components of said polarization from two points spaced from each other along the length of said structure one-quarter of the wavelength of that frequency, a first output means connected to said structure and adapted to support energy polarized at right angles to said given polarization for receiving said reflected energy within said band, and a second output means connected to said structure for receiving non-reflected energy at said other frequencies.

2. An elongated electromagnetic wave guiding enclosure having a conductive boundary that tapers along its length in two orthogonal dimensions of its transverse cross section, said tapers of said two dimensions being offset longitudinally from each other, means for applying electromagnetic wave energy to said enclosure polarized at an acute angle to said dimensions, and means for couplying to energy within said enclosure polarized at right angles to said last named polarization.

3. Filter means for separating a broadband of frequencies of electromagnetic wave energy from other frequencies comprising a conductively bounded structure adapted to support said wave energy in orthogonal polarizations, said structure being cut off at one point along its length for one of said polarizations at the lowest frequency in said band and being cut off at successive points along its length for successively higher frequencies in said band, said structure being cut off at points removed one-quarter wavelength for the other of said polarizations from respective points of cutoff at each frequency for said one polarization, and means for coupling to and from said structure in two respective polarizations at 90 degrees to each other and at 45 degrees to said orthogonal polarizations.

4. An elongated electromagnetic wave guiding structure having equal cutoff frequencies at one point along its length for wave energy polarized in first and second orthogonal polarizations and having different cutoff frequencies at a second point along its length with the cutoff frequency for said first polarization at said second point being equal to the cutoff frequency at said first point and having different cutoff frequencies at a third point along its length with the cutoff frequency for said first polarization at said third point being equal to the cutoff frequency for said second polarization at said second point, said points being spaced along said length such that the round-trip phase shift between said first point and said second point for one of said polarizations is 180 degrees different from the round-trip phase shift between said first point and said third point for the other of said polarizations, and means for coupling linearly polarized energy to and from said structure in a polarization having equal components in said first and second polarizations at said first point.

5. The structure according to claim 4 including means connected to said structure beyond said third point for maintaining a cutoff frequency for said second polarization equal to the cutoff frequency for said first polarization between said first and second points, said cutoff being maintained along a distance equal to the distance between said first and second points.

6. An elongated conductively bounded electromagnetic wave guiding enclosure having equal transverse dimensions at one point along its length in first and second orthogonal axial planes thereof and having different transverse dimensions at a second point along its length with the dimension in said first plane at said second point being equal to the dimensions at said first point and having different transverse dimensions at a third point along its length with the dimension in said first plane at said third point being equal to the dimension in said second plane at said second point, and means for coupling to and from said enclosure electromagnetic wave energy having equal components in said first and second planes at said first point.

7. The structure according to claim 6 wherein the dimensions at said first point produce a cutoff frequency for said enclosure that is lower than the lowest frequency in an operating band of said energy, and wherein the dimension in said second plane at said second point and the dimension in said first plane at said third point produce a cutoff frequency for said enclosure equal to a given frequency within said band.

8. The structure of claim 7 wherein said second and third points are spaced along the axis of said structure substantially one-quarter wavelength at said given frequency.

9. The structure according to claim 7 wherein the conductive boundary of said enclosure tapers smoothly between the dimensions at at least said second and third points.

10. The structure according to claim 7 wherein said enclosure has transverse dimensions at a fourth point that produce a cutoff frequency that is at least equal to the highest frequency in said band.

11. The structure according to claim 10 including means connected to said enclosure at said fourth point for shifting the phase of wave energy polarized in said first plane with respect to wave energy polarized in said second plane.

12. Filter means for separating a broadband of frequencies of electromagnetic wave energy from other frequencies comprising a conductingly bounded structure adapted to support said wave energy in orthogonal polarizations, means for reflecting orthogonal components of frequencies within said band with a reflected phase difference of 180 degrees between said components to achieve a polarization rotation of said reflected energy of 90 degrees, said means including a portion of said structure that is cut off at one point along its length for one of said orthogonal components at any given frequency in said band and cut off for the other of said orthogonal components at said frequency at a point further along said length than said one point by an amount that produces said reflected phase difference, and means for coupling to said reflected energy.

References Cited in the file of this patent

UNITED STATES PATENTS 2,810,890 Klopfenstein ---------- Oct. 22, 1957

FOREIGN PATENTS 664,926 Great Britain ---------- Jan. 16, 1952